(12) United States Patent
Chin et al.

(10) Patent No.: US 8,218,665 B2
(45) Date of Patent: Jul. 10, 2012

(54) SYMBOL TIME SYNCHRONIZATION METHOD FOR OFDM SYSTEMS

(75) Inventors: Wen-Long Chin, Hsinchu (TW); Sau-Gee Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1228 days.

(21) Appl. No.: 12/003,690

(22) Filed: Dec. 31, 2007

(65) Prior Publication Data

US 2009/0028042 A1    Jan. 29, 2009

(30) Foreign Application Priority Data

Jul. 26, 2007    (TW) .............................. 96127173 A

(51) Int. Cl.
*H04L 5/12* (2006.01)
(52) U.S. Cl. ..................................... 375/262
(58) Field of Classification Search .................. 375/262, 375/357, 340–341; 455/265; 714/794–795
See application file for complete search history.

(56) References Cited

U.S. PATENT DOCUMENTS

| 6,678,339 B1 * | 1/2004 | Lashkarian | 375/341 |
| 7,570,684 B2 * | 8/2009 | Zhang et al. | 375/145 |
| 2003/0101411 A1 * | 5/2003 | Denno | 714/794 |

OTHER PUBLICATIONS

Bugallo et al. A Novel Adaptive Algorithm for Generalized Synchronization, IEEE, 2005.*

* cited by examiner

*Primary Examiner* — Khanh C Tran
(74) *Attorney, Agent, or Firm* — Rosenberg, Klein & Lee

(57) ABSTRACT

A symbol time synchronization method for OFDM systems is disclosed. The invention presents a joint maximum-likelihood (ML) synchronization method for symbol time offset (STO) in OFDM systems. The method is developed in frequency domain under time-variant multipath channels. By analyzing the received frequency-domain data, a mathematical model for the joint effects of symbol time offset (STO), carrier frequency offset (CFO) and sampling clock frequency offset (SCFO) is derived. The results are used to formulate a log-likelihood function of two consecutive symbols. The joint estimation's method is robust, because it exhibits high performances in high mobility and time-variant multipath fading channels.

8 Claims, 4 Drawing Sheets

SYMBOL TIME SYNCHRONIZATION METHOD FOR OFDM SYSTEMS

BACKGROUND OF THE INVENTION

1. Field of the Invention

The present invention relates to a synchronization method for communication systems, and more especially, to a symbol time synchronization method for OFDM systems.

2. Background of the Related Art

Orthogonal frequency division multiplexing (OFDM) is a promising technology for broadband transmission due to its high spectrum efficiency, and its robustness to the effects of multipath fading channels. However, it is sensitive to synchronization errors. As a result, one has to achieve as good synchronization as possible in OFDM transmissions.

Like other communication systems, there are many synchronization issues should be taken into considerations in OFDM systems. First of all, unknown signal delays will introduce symbol time offset (STO) and require coarse symbol time (CST) and fine symbol time (FST) synchronizations. There also exists carrier frequency offset between a transmitter and a receiver so that fractional carrier frequency offset (FCFO), integral carrier frequency offset (ICFO) and residual carrier frequency offset (RCFO) have to be eliminated. In addition, the sampling clocks mismatch between DAC and ADC will introduce sampling clock frequency offset (SCFO).

In J. J. van de Beek, M. Sandell and P. O. Borjesson's "ML estimation of time and frequency offset in OFDM systems," (IEEE Trans. Signal Process., vol. 45, no. 7, pp. 1800-1805, July 1997), STO and FCFO are jointly estimated by a delayed-correlation algorithm. It is an ML estimation and only good for AWGN channels.

In T. M. Schmidl and D. C. Cox's "Robust frequency and timing synchronization for OFDM," (IEEE Trans. Commun., vol. 45, no. 12, pp. 1613-1621, December 1997), a new method making use of training symbols in time-domain was proposed. However, its correlation results exhibit uncertain plateau in multipath fading channels.

Some techniques, for example in H. Minn, V. K. Bhargava and K. B. Letaief's "A robust timing and frequency synchronization for OFDM systems," (IEEE Trans. Wireless Commun., vol. 2, no. 4, pp. 822-839, July 2003), produce good ST (symbol time) performances. However, extra time-domain training symbols are needed.

The techniques mentioned above are applied to AWGN and/or static multiple channel condition, thus will not be suitable for real environments.

Although the technique in K. Ramasubramanian and K. Baum's "An OFDM timing recovery scheme with inherent delay-spread estimation," (GLOBECOM'01. IEEE. vol. 5, pp. 3111-3115, Nov. 2001.7) can identify ISI-free region in multipath fading channels, for accurate ST estimation, it may involve too many symbols.

In M. Speth, S. Fechtel, G. Fock and H. Meyer's "Optimum receiver design for OFDM-based broadband transmission-part II: a case study," (IEEE Trans. Commun., vol. 49, no. 4, pp. 571-578, Apr. 2001.8), for FST, channel responses must be estimated first, IFFT is then applied to get the channel impulse responses (CIR) and adjust the symbol boundary. Hence, its computational complexity is high.

The work in D. Lee and K. Cheun's "Coarse symbol synchronization algorithms for OFDM systems in multipath channels," (IEEE Commun. Letter, vol. 6, no. 10, pp. 446-448, October 2002), treats CST in multipath fading channels.

T. Lv, H. Li and J. Chen's "Joint estimation of symbol timing and carrier frequency offset of OFDM signals over fast time-varying multipath channels," (IEEE Trans. Signal Process., vol. 53, no. 12, pp. 4526-4535, December 2005) and J. C. Lin, "Maximum-likelihood frame timing instant and frequency offset estimation for OFDM communication over a fast Rayleigh-fading channel," (IEEE Trans. Vehicular Tech., vol. 52, no. 4, pp. 1049-1062, July 2003) assume that normalized Doppler frequency (NDF) is known. This restricts their applicability.

SUMMARY OF THE INVENTION

In order to solve the problems mentioned above, the present invention provides a symbol time synchronization method for OFDM systems. The present invention provides a joint maximum-likelihood (ML) synchronization method for symbol time offset (STO), wherein the method is developed in frequency-domain under time-variant multipath channels. By analyzing the received frequency-domain data, a mathematical model for the joint effects of STO, CFO and SCFO is derived, thus the present invention is suitable for high mobility and non-line-of-sight (NLOS) applications To achieve the purpose mentioned above, the present invention provides a symbol time synchronization method for OFDM systems, which includes: receiving frequency domain data from a plurality of channels, and analyzing the frequency domain data; generating a probability density function from the frequency domain data; establishing a log-likelihood function from the probability density function; making maximum-likelihood estimation according to the log-likelihood function; and generating symbol time offset (STO) from the maximum-likelihood estimation.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Figure 1:
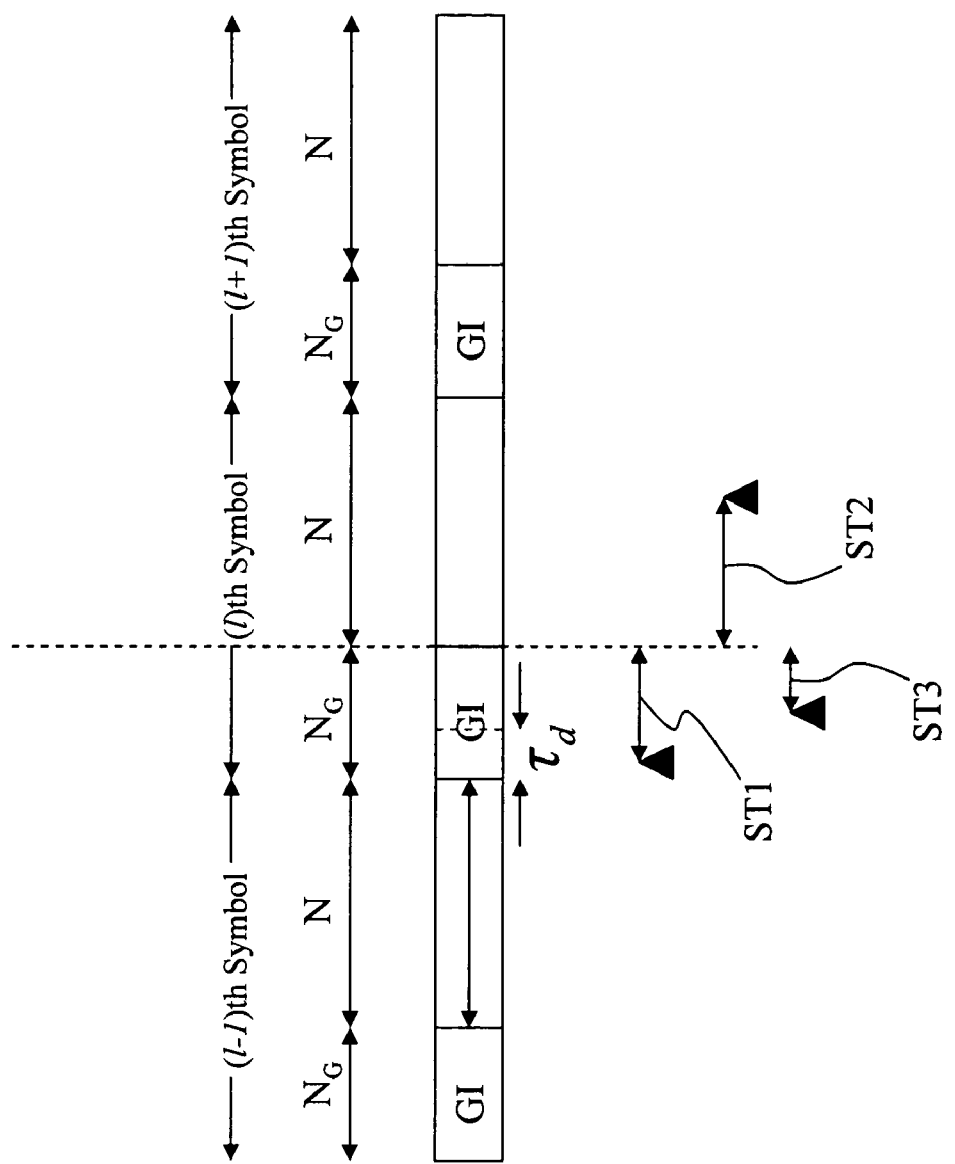
FIG. 1 illustrating three consecutive symbols' ST in an OFDM system.

Symbol time (ST) estimation is usually the first step in an entire OFDM synchronization process, because it provides an estimated OFDM symbol boundary for the remaining synchronization steps. As shown in FIG. 1 is three consecutive symbols' ST in an OFDM system, three consecutive symbols are (l−1)th Symbol, (l)th Symbol and (l+1)th Symbol. Everyone has a guard interval (GI), and an estimated ST generally falls into one of the three defined regions, where Bad ST1 and Good ST3 are in the guard interval (of length $N_G$) of an OFDM symbol. In the figure, Bad ST1 region and Bad ST2 region for the lth symbol has inter-symbol interference (ISI) from the (l−1)th symbol and the (l+1)th symbol, respectively. On the other hand, in time-invariant channels, if ST is located in Good ST3 region, there will be no ISI but only phase rotation in the demodulated frequency-domain data, which can be simply compensated by single-tap equalizers.

Figure 2:
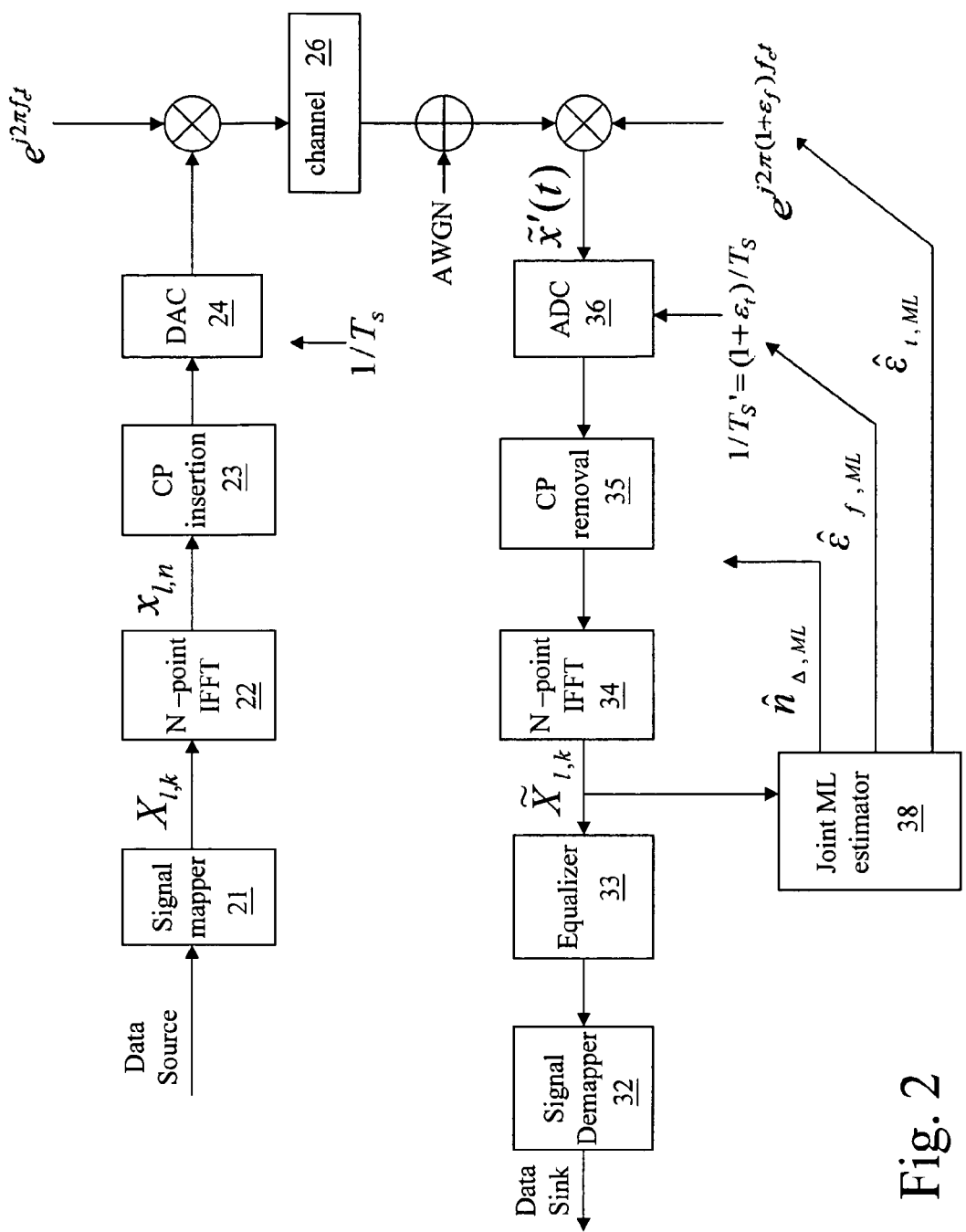
FIG. 2 illustrating an OFDM system according to one embodiment of the present invention.

The FIG. 2 shows an OFDM system according to one embodiment of the present invention. In the transmitter side, the baseband digital signals go through signal mapper 21 and processed by N-point IFFT 22, the Inverse Fast Fourier Transform, then inserted the CP (cyclic prefix) in the guard interval 23, performed D/A conversion in DAC 24, and finally deliver them to the channel 26.

In the receiver side, the radio waves are received from the channel 26, they are demodulated, and sampled in the ADC 36 to convert to digital signals. The CP in the digital signals are removed in CP removal 35, then processed by N-point FFT 34, equalizer 33, and signal demapper 32, finally the receiver derives serial digital signals.

In addition, the joint ML estimator 38 is coupled to the output of N-point FFT 34, the symbol time offset (STO) calculated by the estimator, and the STO is then feedback to the CP removal 35 for symbol time synchronization.

In the FIG. 2, $X_{l,k}$ is the transmitted/received frequency-domain data on the kth subcarrier, $x_{l,n}$ is the transmitted time-domain data sample of the lth symbol, $\tilde{x}'(t)$ is the received continuous-time signal, N is FFT size, and $N_S = N + N_G$ is an OFDM symbol length including cyclic prefix (CP); $1/T_S$ is the transmitter sampling frequency, and $1/T_S' = (1+\epsilon_t)/T_S$ is the receiver sampling frequency, where $\epsilon_t$ is the SCFO normalized by $1/T_S$, $\epsilon_f$ is the CFO normalized by subcarrier spacing; $f_c$ is the carrier frequency, $\hat{n}_{\Delta,ML}$ is the estimated ML STO, $\hat{\epsilon}_{f,ML}$ is the estimated ML RCFO and $\hat{\epsilon}_{t,ML}$ is the estimated ML SCFO.

Figure 3:
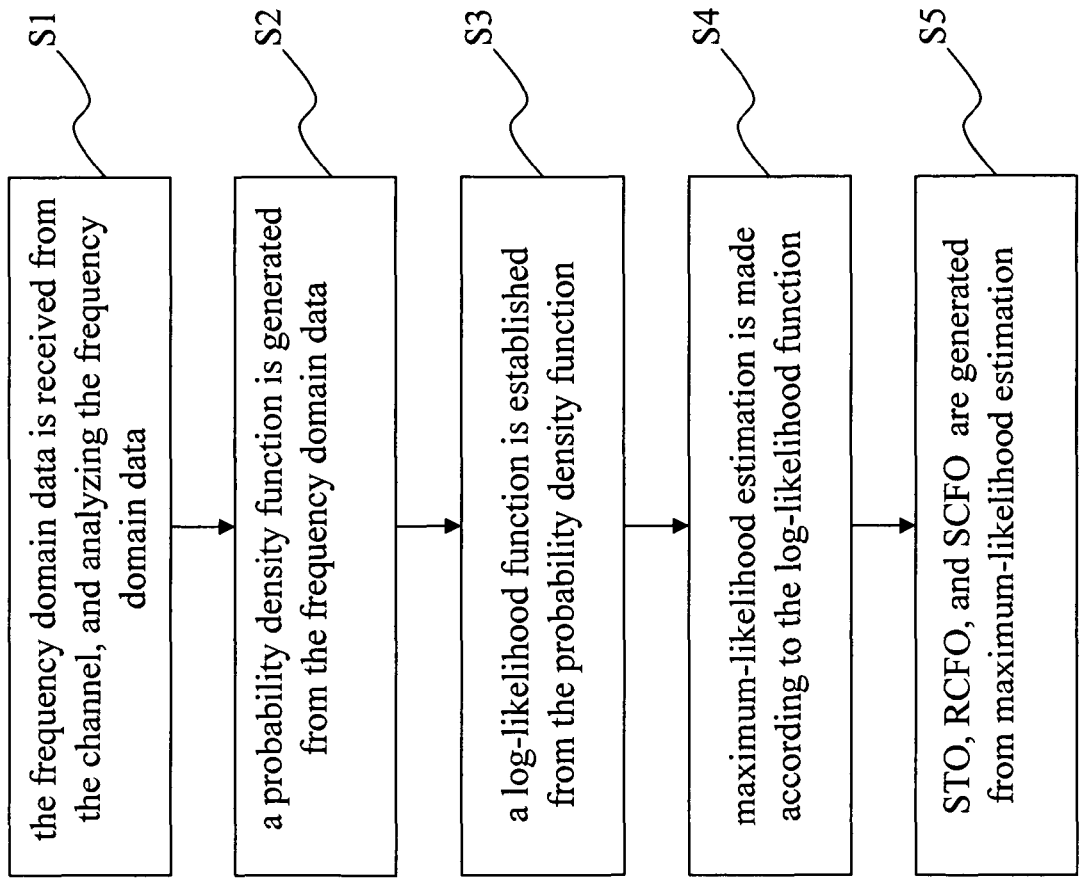
FIG. 3 illustrating a symbol time synchronization method for OFDM systems according to one embodiment of the present invention.

The FIG. 3 shows a symbol time synchronization method for OFDM systems according to one embodiment of the present invention. The method includes: step S1 the frequency domain data is received from the channel, and analyzing the frequency domain data; step S2 a probability density function is generated from the frequency domain data; step S3 a log-likelihood function is established from the probability density function; step S4 maximum-likelihood estimation is made according to the log-likelihood function; and step S5 symbol time offset (STO), residual carrier frequency offset (RCFO), and sampling clock frequency offset (SCFO) are generated from maximum-likelihood estimation.

Here, $h_l(n, \tau)$ is the baseband time-variant channel impulse response of the lth symbol. It is assumed wide-sense stationary and uncorrelated scattering (WSSUS), and can be modeled as a tapped-delay-line channel. A scattering function can be modeled as a time-varying function of Doppler frequency. The present invention assumes that the delay power spectrum follows an exponential distribution of the Doppler spectrum. Based on these assumptions, the cross-correlation of a CIR is given by Equation (1)

$$E[h_l(n_1, \tau_1) h_l^*(n_2, \tau_2)] = E[h_l(n_1, \tau_1) h_l^*(n_2, \tau_2)] \times \delta(\tau_1 - \tau_2) \quad (1)$$
$$= \gamma \cdot J_0(\beta \cdot \Delta n) \cdot e^{-\tau/\tau_d} |_{\tau=\tau_1=\tau_2}.$$

where $\gamma$ is a normalization constant, $J_0(\cdot)$ is the zeroth-order Bessel function of the first kind, $\beta = 2\pi f_d T/N$, $\Delta n = (n_1 - n_2)$, $f_d$ represents the maximum Doppler shift in Hertz, $T = NT_s$ is the symbol duration and $\tau_d$ is the maximum delay spread. NDF is interchangeable with $f_d T$ here.

The estimated ST will be located in one of three different regions as depicted in FIG. 1, where STO is with reference to the ideal ST of the lth symbol which is marked by the time index at zero. Detailed analysis of the received frequency-domain data in these three regions is omitted and the result is shown below.

Case 1: In Good ST3 region.
Step A1:

$$\tilde{X}_{l,k} \approx \hat{H}_{1,k} X_{l,k} W_N^{[lN_S(k\epsilon_t - \epsilon_f) - kn\Delta]} + \hat{N}_{1,k},$$

where $$W_n \triangleq e^{-j2\pi/N}$$

and $\sigma_k$ is AWGN;
Step A2:

$$\hat{H}_{1,k} \triangleq \frac{1}{N} \sum_{n'=0}^{N-1} H_l(n', k) \times W_N^{-n'(\epsilon_f - k\epsilon_t)}; \text{ and}$$

Step A3:

$$\hat{N}_{1,k} \triangleq$$

$$\sum_{m \neq k} X_{l,m} \left[ \frac{1}{N} \sum_{n'=0}^{N-1} H_l(n', m) \times W_N^{-n'[m(1-\epsilon_t)-k+\epsilon_f]} \right] \times W_N^{lN_S(m\epsilon_t - \epsilon_f)} \times W_N^{-kn\Delta} +$$

$$v_k.$$

Case 2: In Bad ST1 region.
Step A4:

$$\tilde{X}_{l,k} \approx \hat{H}_{2,k} X_{l,k} W_N^{[lN_S(k\epsilon_t - \epsilon_f) - kn\Delta]} + \hat{N}_{2,k},$$

where $$\tilde{H}_{2,k} \triangleq \frac{1}{N} \sum_{n'=N_1}^{N_1} H_l(n', k) \times W_N^{-n'(\epsilon_f - k\epsilon_t)},$$

$$N_1 = -N_G + \tau_d - n_\Delta + 1,$$

$$\hat{N}_{2,k} \triangleq \hat{N}_{1,k} - \tilde{X}_{l,k}^{ici,1} + \tilde{X}_{l,k}^{isi,1};$$

Step A5:

$$\tilde{X}_{l,k}^{ici,1} \approx \sum_{m \neq k} X_{l,m} \left[ \frac{1}{N} \sum_{n'=0}^{N_1 - 1} H_l(n', m) \times W_N^{-n'[m(1-\epsilon_t)-k+\epsilon_f]} \right] \times$$

-continued $$W_N^{lN_S(m\varepsilon_t-\varepsilon_f)} \times W_N^{-kn_\Delta},;$$

and

Step A6:

$$\tilde{X}_{l,k}^{isi,1} \approx \sum_{m=-K}^{K} X_{l-1,m}\left[\frac{1}{N}\sum_{n'=0}^{N_1-1} H_{l-1}(n'+N_G,m) \times W_N^{-n'[m(1-\varepsilon_t)-k+\varepsilon_f]}\right] \times$$

$$W_N^{lN_S(m\varepsilon_t-\varepsilon_f)} \times W_N^{-k(n_\Delta-N_G)}.$$

Case 3: In Bad ST2 region.
Step A7:

$$\tilde{X}_{l,k} \approx \hat{H}_{3,k} X_{l,k} W_N^{[lN_S(k\varepsilon_t-\varepsilon_f)-kn_\Delta]} + \hat{N}_{3,k},$$

where $$\hat{H}_{3,k} \triangleq \frac{1}{N}\sum_{n'=0}^{N-n_\Delta-1} H_l(n',k) \times W_N^{-n'(\varepsilon_f-k\varepsilon_t)},$$

$$\hat{N}_{3,k} \triangleq \hat{N}_{1,k} - \tilde{X}_{l,k}^{ici,2} + \tilde{X}_{l,k}^{isi,2};$$

Step A8:

$$\tilde{X}_{l,k}^{ici,2} \approx \sum_{m \neq k} X_{l,m}\left[\frac{1}{N}\sum_{n'=N-n_\Delta}^{N_1-1} H_l(n',m) \times W_N^{-n'[m(1-\varepsilon_t)-k+\varepsilon_f]}\right] \times$$

$$W_N^{lN_S(m\varepsilon_t-\varepsilon_f)} \times W_N^{-kn_\Delta},;$$

and

Step A9:

$$\tilde{X}_{l,k}^{isi,2} \approx \sum_{m=-K}^{K} X_{l+1,m}\left[\frac{1}{N}\sum_{n'=N-n_\Delta}^{N-1} H_{l+1}((n'-N_G)_N,m) \times W_N^{-n'[m(1-\varepsilon_t)-k+\varepsilon_f]}\right] \times$$

$$W_N^{lN_S(m\varepsilon_t-\varepsilon_f)} \times W_N^{-k(n_\Delta-N_G)}.$$

(From A1~A9, there are approximations "≈" because detailed derivations are omitted.) From Step (A1), (A4) and (A9), the present invention illustrates that the received data is multiplied by different time-averaged time-variant transfer functions. The interferences are also different in different regions. They can be well approximated by Gaussian random variables. As such, the received frequency-domain data can be rewritten as Equation (2).

$$\tilde{X}_{l,k} \approx \hat{H}_{l,k} X_{l,k} W_N^{[lN_S(k\varepsilon_t-\varepsilon_f)-kn_\Delta]} + \hat{N}_{l,k}, \quad i=1,2,3 \quad (2),$$

where l is a symbol index; $\tilde{X}_{l,k}$ is a received frequency-domain data on a k-th subcarrier; $X_{l,k}$ is a transmitted frequency-domain data on the k-th subcarrier; $\hat{H}_{l,k}$ is a channel frequency response on the k-th subcarrier; $W_N = e^{-j2\pi/N}$; $\hat{N}_{l,k}$ is a FFT (fast Fourier transform) of AWGN (Additive White Gaussion Noise); N is a FFT size; Ns is a whole symbol length including the cyclic prefix; $\varepsilon_t$ is a SCFO (sampling clock frequency offset); $\varepsilon_f$ is a RCFO (residual carrier frequency offset); and $n_\Delta$ a STO (symbol time offset).

Note that index i that denotes the three different regions will be dropped for clarity.

It is assumed that $X_{l,k}$ is an evenly-spaced pseudo random binary sequence (PRBS) for k∈P, P is the pilot set. $X_{l,k}$'s are assumed uncorrelated and zero mean for k∉P. Therefore Equation (3) exists, $$E[X_{l_1,k_1} X_{l_2,k_2}^*] = \begin{cases} \sigma_X^2 \delta(k_1-k_2), & k_1, k_2 \in P \\ \sigma_X^2 \delta(l_1-l_2)\delta(k_1-k_2), & \text{otherwise} \end{cases} \quad (3)$$

where $\sigma_x^2$ is the signal power and $\delta(\cdot)$ is Dirac delta function. By Equation (2) and Equation (3), the correlation between two consecutive frequency-domain symbols can be written as Equation (4).

$$E[\tilde{X}_{l_1,k_1} \tilde{X}_{l_2,k_2}^*] = \begin{cases} \sigma_{\hat{H}_k}^2 \sigma_X^2 + \sigma_{\hat{N}_k}^2, & l_1 = l_2 \\ & k_1 = k_2 = k \\ \sigma_{\hat{H}_k'}^2 \sigma_X^2 W_N^{-N_S(k\varepsilon_t-\varepsilon_f)}, & l_2 = l_1+1 \\ & k_t = k_2 = k, k \in P \\ 0, & \text{otherwise} \end{cases} \quad (4)$$

where $\sigma_{\hat{H}_k'}^2$ and $\sigma_{\hat{H}_k}^2$ are cross-correlation and auto-correlation of time averaged channel time-variant frequency responses; $\sigma_X^2$ is a variance of the transmitted frequency domain data; $\sigma_{\hat{N}_k}^2$ is a variance of the AWGN; and P is a pilot set. Since $\tilde{X}_{l,k}$ is a complex gaussian distribution, and $\tilde{X}_{l,k}$ and $\tilde{X}_{l+1,k}$ are joint complex gaussian distribution, $f(\tilde{X}_{l,k}, \tilde{X}_{l+1,k})$, $f(\tilde{X}_{l,k})$ and $f(\tilde{X}_{l+1,k})$ in Equation (5) is described by Equation (4.1) and (4.2) derived from Equation (4).

$$f(\tilde{X}_{l,k}, \tilde{X}_{l+1,k}) = \frac{\exp\left(-\frac{|\tilde{X}_{l,k}|^2 - 2\rho_k \text{Re}\left[W_N^{-N_S(k\varepsilon_t-\varepsilon_f)} \cdot \tilde{X}_{l,k} \tilde{X}_{l+1,k}^*\right] + |\tilde{X}_{l+1,k}|^2}{2(\sigma_{\hat{H}_k}^2 \sigma_X^2 + \sigma_{\hat{N}_k}^2)(1-\rho_k^2)}\right)}{2\pi(\sigma_{\hat{H}_k}^2 \sigma_X^2 + \sigma_{\hat{N}_k}^2)(1-\rho_k^2)^{1/2}}, \quad (4.1)$$

$$f(\tilde{X}_{l,k}) = \frac{\exp\left(-\frac{|\tilde{X}_{l,k}|^2}{2(\sigma_{\hat{H}_k}^2 \sigma_X^2 + \sigma_{\hat{N}_k}^2)}\right)}{\left[2\pi(\sigma_{\hat{H}_k}^2 \sigma_X^2 + \sigma_{\hat{N}_k}^2)\right]^{1/2}}, \quad (4.2)$$

where Re[.] is the real number of the quantity; and $\rho_k$ is the correlation coefficient of received frequency-domain data on a k-th subcarrier.

Note that $\tilde{X}_{l+1,k}$ has the same pdf with $\tilde{X}_{l,k}$.

The corresponding log-likelihood function of Equation (4) can be written as Equation (5).

$$\Lambda(n_\Delta, \varepsilon_f, \varepsilon_t) = \log\left(\prod_{k \in P} f(\tilde{X}_{l,k}, \tilde{X}_{l+1,k}) \times \prod_{k \notin P} f(\tilde{X}_{l,k}) f(\tilde{X}_{l+1,k})\right) \quad (5)$$

where $f(\cdot)$ denotes the probability density function (and the conditioning on $(n_\Delta, \varepsilon_f, \varepsilon_t)$ are dropped for notational clarity).

Therefore, Equation (5) can be derived in Equation (5.1).

$$\Lambda(n_\Delta, \varepsilon_f, \varepsilon_t) = \sum_{k \in P}\left\{c_{2,k}|\gamma(n_\Delta)|\cos\left[\frac{2\pi N_s(k\varepsilon_t - \varepsilon_f)}{N} - \angle\gamma(n_\Delta)\right] - c_{3,k}\Phi(n_\Delta)\right\} - \sum_k c_{4,k}\Phi(n_\Delta) + c_1 \quad (5.1)$$

where $$c_1 = -\left[\sum_{k \in P}\log(1 - \rho_k^2)\right]/2 - \sum_k \log 2\pi(\sigma_{\tilde{H}_k}^2 \sigma_X^2 + \sigma_{\tilde{N}_k}^2)$$

$$c_{2,k} = \rho_k \Big/ (\sigma_{\tilde{H}_k}^2 \sigma_X^2 + \sigma_{\tilde{N}_k}^2)(1 - \rho_k^2)$$

$$c_{3,k} = \rho_k c_{2,k}; \quad c_{4,k} = c_{2,k}(1 - \rho_k^2)/\rho_k,$$

where $$c_{2,k} = \rho_k \Big/ (\sigma_{\tilde{H}_k}^2 \sigma_X^2 + \sigma_{\tilde{N}_k}^2)(1 - \rho_k^2);$$

$$c_{3,k} = \rho_k c_{2,k}; \quad c_{4,k} = c_{2,k}(1 - \rho_k^2)/\rho_k;$$

$\gamma(n_\Delta)$ is defined as $\tilde{X}_{l,k}\tilde{X}_{l+1,k}^*$; and $\Phi(n_\Delta)$ is defined as $$\frac{1}{2}(|\tilde{X}_{l,k}|^2 + |\tilde{X}_{l+1,k}|^2).$$

$\rho_k$ is the magnitude of the correlation coefficient between $\tilde{X}_{l,k}$ and $\tilde{X}_{l+1,k}$ as shown in Equation (6).

$$\rho_k \triangleq \left|\frac{E[\tilde{X}_{l,k}\tilde{X}_{l+1,k}^*]}{\sqrt{E[|\tilde{X}_{l,k}|^2]E[|\tilde{X}_{l+1,k}|^2]}}\right|, k \in P. \quad (6)$$

In addition with Equations (7) and (8), $$\gamma(n_\Delta) \triangleq \tilde{X}_{l,k}\tilde{X}_{l+1,k}^*, \quad (7)$$

$$\Phi(n_\Delta) \triangleq \frac{1}{2}(|\tilde{X}_{l,k}|^2 + |\tilde{X}_{l+1,k}|^2) \quad (8)$$

the maximization of the log-likelihood function can be performed in two steps as shown in Equation (9), $$\max_{(n_\Delta,\varepsilon_f,\varepsilon_t)} \Lambda(n_\Delta, \varepsilon_f, \varepsilon_t) = \max_{n_\Delta}\max_{(\varepsilon_f,\varepsilon_t)} \Lambda(n_\Delta, \varepsilon_f, \varepsilon_t) \quad (9)$$

$$= \max_{n_\Delta}\Lambda(n_\Delta, \varepsilon_{f,ML}, \varepsilon_{t,ML}).$$

Obviously, under the condition of optimal RCFO and SCFO, i.e., $$(\varepsilon_f, \varepsilon_t) \triangleq (\varepsilon_{f,ML}, \varepsilon_{t,ML}),$$

Equation (5) is reduced to Equation (10).

$$\Lambda(n_\Delta, \varepsilon_{f,ML}, \varepsilon_{t,ML}) = \sum_{k \in P}(c_{2,k}|\gamma(n_\Delta)| - c_{3,k}\Phi(n_\Delta)) - \sum_k c_{4,k}\Phi(n_\Delta). \quad (10)$$

Hence, the optimal ST $n_\Delta \triangleq n_{\Delta,ML}$ can be obtained by maximizing Equation (5), and the joint ML estimation includes following steps:

Step 1: Estimate by using Equation (11).

$$\hat{n}_{\Delta\ldots ML} = \arg\max_{n_\Delta}\left[\sum_{k \in P}(c_{2,k}|\gamma(n_\Delta)| - c_{3,k}\Phi(n_\Delta)) - \sum_k c_{4,k}\Phi(n_\Delta)\right], \quad (11)$$

Step 2: Given $\hat{n}_{\Delta,ML}$, estimate $(\hat{\varepsilon}_{f,ML}, \hat{\varepsilon}_{t,ML})$ by using the constraint in Equation (12).

$$k\hat{\varepsilon}_{t,ML} - \hat{\varepsilon}_{f,ML} = \frac{1}{2\pi}\frac{N}{N_s}\angle\gamma(\hat{n}_{\Delta,ML}). \quad (12)$$

Note the present invention assumes that the condition $|N_s(k\varepsilon_t - \varepsilon_f)/N| < 1/2$ is satisfied so that there is no phase ambiguity. The joint SCFO and RCFO can be estimated by Equation (13).

$$\begin{cases}\hat{\varepsilon}_{t,ML} = \frac{1}{2\pi}\frac{N}{N_s}\frac{1}{M}\angle\left(\sum_{k \in P^+}\tilde{X}_{l,k}\tilde{X}_{l+1,k}^* - \sum_{k \in P^-}\tilde{X}_{l,k}\tilde{X}_{l+1,k}^*\right) \\ \hat{\varepsilon}_{f,ML} = -\frac{1}{2\pi}\frac{N}{N_s}\angle\left(\sum_{k \in P^+}\tilde{X}_{l,k}\tilde{X}_{l+1,k}^* + \sum_{k \in P^-}\tilde{X}_{l,k}\tilde{X}_{l+1,k}^*\right)\end{cases} \quad (13)$$

where $P^+$, $P^- \in P$ are the set of positive/negative frequency-domain pilots.

In the present invention, each ensemble average value of $\rho_k$ must be found. However, it is impractical to estimate it by using its time average value. A practical solution to this problem is that we can reasonably assume a single averaged value $\rho$ for all $\rho_k$'s as shown in Equation (14).

$$\rho = \sum_k|\tilde{X}_{l,k}\tilde{X}_{l+1,k}^*| \Big/ \sqrt{\sum_k|\tilde{X}_{l,k}|^2\sum_k|\tilde{X}_{l+1,k}|^2}. \quad (14)$$

That is, the denominator and numerator of $\rho_k$ are replaced by the averaged values of $$\sqrt{\sum_k|\tilde{X}_{l,k}|^2\sum_k|\tilde{X}_{l+1,k}|^2}\Big/N \text{ and } \sum_k|\tilde{X}_{l,k}\tilde{X}_{l+1,k}^*|\Big/N,$$

respectively. Hence, the ML estimation (11) can be simplified as Equation (15).

$$\hat{n}_{\Delta,ML} = \arg\max_{n_\Delta}\left[\sum_{k \in P}(\rho|\gamma(n_\Delta)| - \Phi(n_\Delta)) - \sum_{k \notin P}(1 - \rho^2)\Phi(n_\Delta)\right]. \quad (15)$$

Figure 4:
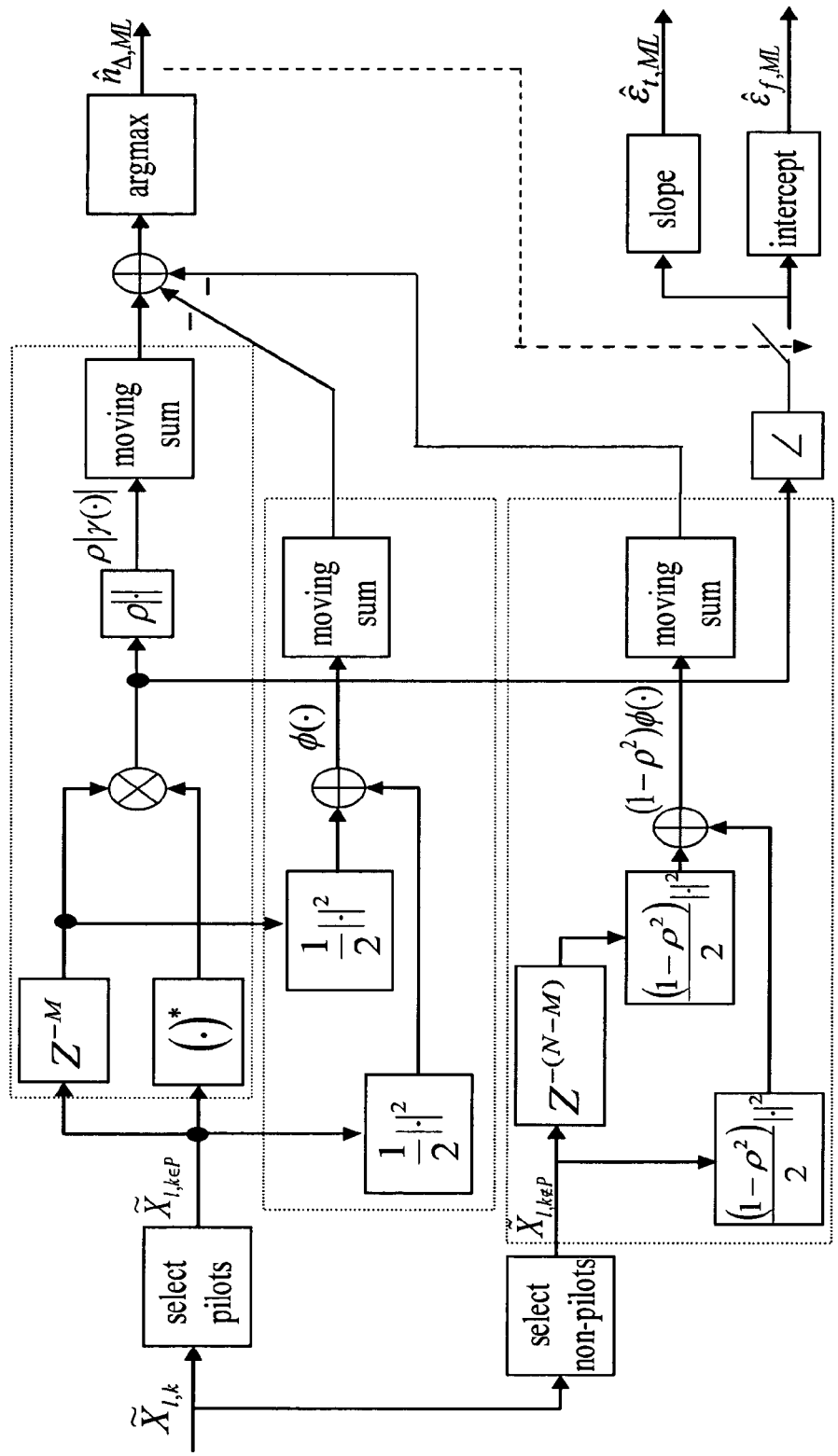
FIG. 4 illustrating architecture of the joint ML estimator according to one embodiment of the present invention.

The ML estimations of SCFO and RCFO under the simplified condition are still the same as (13). A realization of (15) and (13) is shown in FIG. 4.

By approximating interferences as Gaussian distributed random processes, a joint ML method for the three major synchronization errors is presented. The method is robust in the sense that the estimation's MSE is low and does not degrade significantly under low SNR and high mobility conditions in time-variant multipath fading channels. As such, the proposed technique is suitable for high mobility and non-line-of-sight (NLOS) applications, like 802.16e. In addition, the method is efficient in the sense that STO, RCFO and SCFO are jointly estimated at the same time.

Accordingly, the feature of the present invention is to provide a joint maximum-likelihood (ML) synchronization method for symbol time offset (STO), carrier frequency offset (CFO) and sampling clock frequency offset (SCFO) for OFDM systems. Unlike most existing techniques which are time-domain approaches considering only AWGN and/or static multipath conditions, the proposed algorithm is developed in frequency-domain under time-variant multipath channels. By analyzing the received frequency-domain data, a mathematical model for the joint effects of STO, CFO and SCFO is derived. The results are used to formulate a log-likelihood function of two consecutive symbols. Based on the function, a joint ML algorithm is proposed. The method is both efficient and robust, because the three main synchronization issues are treated altogether. Simulation results exhibit high performances in time-variant multipath fading channels.

Although the present invention has been explained in relation to its preferred embodiment, it is to be understood that other modifications and variation can be made without departing the spirit and scope of the invention as hereafter claimed.

What is claimed is:

1. A symbol time synchronization method for OFDM systems, the method comprising:
receiving frequency domain data from a plurality of channels, and analyzing said frequency domain data; and
processing said frequency domain data by using a joint maximum-likelihood estimator, and procedures used to obtain the estimator comprise:
generating a probability density function from said frequency domain data;
establishing a log-likelihood function from said probability density function;
doing maximum-likelihood estimation according to said log-likelihood function; and
generating symbol time offset (STO) from said maximum-likelihood estimation.

2. The symbol time synchronization method for OFDM systems according to claim 1, wherein said frequency domain data are $$\tilde{X}_{l,k} \approx \hat{H}_{l,k} X_{l,k} W_N^{[lN_s(k\epsilon_t - \epsilon_f) - kn_\Delta]} + \hat{N}_{l,k}, \quad l=1, 2, 3,$$

where l is a symbol index; $\tilde{X}_{l,k}$ is a received frequency-domain data on a k-th subcarrier; $X_{l,k}$ is a transmitted frequency-domain data on the k-th subcarrier; $\hat{H}_{l,k}$ is a channel frequency response on the k-th subcarrier; $W_N = e^{-j2\pi/N}$; $\hat{N}_{l,k}$ is a FFT (fast Fourier transform) of AWGN (Additive White Gaussion Noise); N is a FFT size; Ns is a whole symbol length including the cyclic prefix; $\epsilon_t$ is a SCFO (sampling clock frequency offset); $\epsilon_f$ is a RCFO (residual carrier frequency offset); and $n_\Delta$ is a STO (symbol time offset).

3. The symbol time synchronization method for OFDM systems according to claim 2, wherein said frequency domain data is analyzed by a frequency domain data analyzing equation:

$$E[\tilde{X}_{l_1,k_1} \tilde{X}^*_{l_2,k_2}] = \begin{cases} \sigma^2_{\hat{H}_k} \sigma^2_X + \sigma^2_{\hat{N}_k}, & l_1 = l_2 \\ & k_1 = k_2 = k \\ \sigma^2_{\hat{H}'_k} \sigma^2_X W_N^{-N_s(k\epsilon_t - \epsilon_f)}, & l_2 = l_1 + 1 \\ & k_1 = k_2 = k, k \in P \\ 0, & \text{otherwise} \end{cases},$$

, where $\sigma^2_{\hat{H}'_k}$ and $\sigma^2_{\hat{H}_k}$ are cross–correlation and auto–correlation of time averaged channel time–variant frequency responses;

$\sigma^2_X$ is a variance of the transmitted frequency domain data;

$\sigma^2_{\hat{N}_k}$ is a variance of the AWGN; and $P$ is a pilot set.

4. The symbol time synchronization method for OFDM systems according to claim 1, wherein said log-likelihood function is $$\Lambda(n_\Delta, \epsilon_f, \epsilon_t) = \log\left(\prod_{k \in P} f(\tilde{X}_{l,k}, \tilde{X}_{l+1,k}) \times \prod_{k \notin P} f(\tilde{X}_{l,k}) f(\tilde{X}_{l+1,k})\right).$$

5. The symbol time synchronization method for OFDM systems according to claim 4, wherein said log-likelihood function under optimal residual carrier frequency offset (RCFO) and sampling clock frequency offset (SCFO) may be simply expressed in $$\Lambda(n_\Delta, \epsilon_{f,ML}, \epsilon_{t,ML}) = \sum_{k \in P}(c_{2,k}|\gamma(n_\Delta)| - c_{3,k}\Phi(n_\Delta)) - \sum_k c_{4,k}\Phi(n_\Delta),$$

where $c_{2,k} = \rho_k / \left(\sigma^2_{\hat{H}_k}\sigma^2_X + \sigma^2_{\hat{N}_k}\right)(1 - \rho_k^2)$;

$c_{3,k} = \rho_k c_{2,k}$;

$c_{4,k} = c_{2,k}(1 - \rho_k^2)/\rho_k$;

$\gamma(n_\Delta)$ is defined as $\tilde{X}_{l,k} + \tilde{X}^*_{l+1,k}$; and $\Phi(n_\Delta)$ is defined as $\frac{1}{2}\left(|\tilde{X}_{l,k}|^2 + |\tilde{X}_{l+1,k}|^2\right)$.

6. The symbol time synchronization method for OFDM systems according to claim 5, wherein said generating symbol time offset (STO) from $$\hat{n}_{\Delta,ML} = \arg\max_{n_\Delta}\left[\sum_{k \in P}(c_{2,k}|\gamma(n_\Delta)| - c_{3,k}\Phi(n_\Delta)) - \sum_k c_{4,k}\Phi(n_\Delta)\right].$$

7. The symbol time synchronization method for OFDM systems according to claim 6, further comprising using a single averaged value ρ for all $\rho_k$, said single averaged value ρ may be $$\rho = \sum_k |\tilde{X}_{l,k} \tilde{X}^*_{l+1,k}| \Big/ \sqrt{\sum_k |\tilde{X}_{l,k}|^2 \sum_k |\tilde{X}_{l+1,k}|^2}.$$

8. The symbol time synchronization method for OFDM systems according to claim 7, wherein said maximum-likelihood estimation is simplified as:

$$\hat{n}_{\Delta,ML} = \arg\max_{n_\Delta} \left[ \sum_{k \in P} (\rho |\gamma(n_\Delta)| - \Phi(n_\Delta)) - \sum_{k \notin P} (1 - \rho^2)\Phi(n_\Delta) \right].$$

* * * * *